Figure 1:
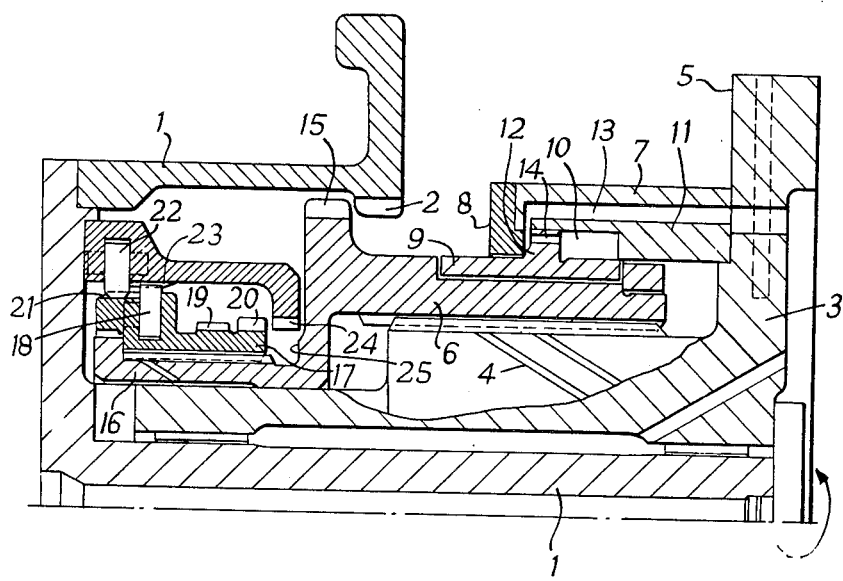
Figure 1A:
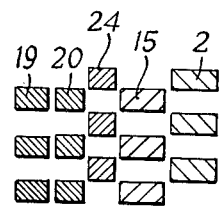

Aug. 31, 1965

H. A. CLEMENTS 3,203,526

SYNCHRONOUS SELF-SHIFTING CLUTCHES

Filed March 12, 1963

5 Sheets-Sheet 1

INVENTOR
HERBERT ARTHUR CLEMENTS

BY
Benjamin Sweetser
ATTORNEY

Aug. 31, 1965     H. A. CLEMENTS     3,203,526
SYNCHRONOUS SELF-SHIFTING CLUTCHES

Filed March 12, 1963     5 Sheets-Sheet 2

INVENTOR
HERBERT ARTHUR CLEMENTS

BY
Benjamin Sweedler
ATTORNEY

Aug. 31, 1965   H. A. CLEMENTS   3,203,526
SYNCHRONOUS SELF-SHIFTING CLUTCHES
Filed March 12, 1963   5 Sheets-Sheet 3
Fig. 3.
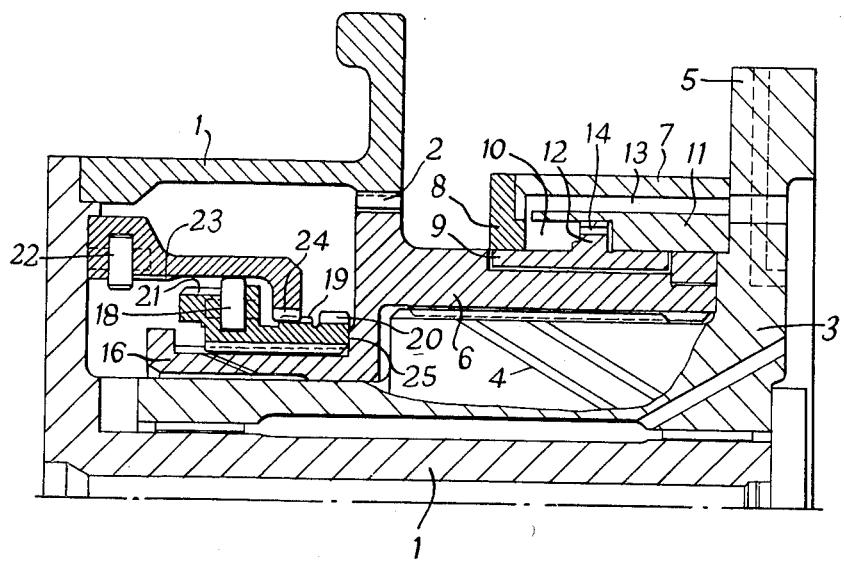
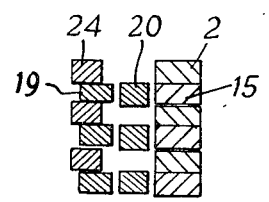
Fig. 3A.
INVENTOR
HERBERT ARTHUR CLEMENTS
BY
Benjamin Sweedler
ATTORNEY

United States Patent Office 3,203,526
Patented Aug. 31, 1965

3,203,526
SYNCHRONOUS SELF-SHIFTING CLUTCHES
Herbert Arthur Clements, Weybridge, Surrey, England, assignor to S.S.S. Patents Limited, Surrey, England, a British company
Filed Mar. 12, 1963, Ser. No. 264,630
Claims priority, application Great Britain, Mar. 16, 1962, 10,209/62
3 Claims. (Cl. 192—67)

This invention relates to synchronous self-shifting clutches of the type comprising a first toothed rotary clutch member provided with clutch teeth, a second rotary clutch member, and an intermediate member provided with clutch teeth and constrained for helical movement relative to the second clutch member whereby to bring the clutch teeth of the intermediate member into and out of engagement with the clutch teeth of the first clutch member, means being provided, e.g. pawl and ratchet mechanism, for initiating precise inter-engagement of the teeth of the intermediate member and the first clutch member upon relative angular movement of the first and second clutch members in one direction. The present invention is an improvement in or modification of the invention to which United States Patent 3,106,276 granted October 8, 1963, relates, viz. a synchronous self-shifting clutch of the type above referred to, wherein the intermediate member and one of the first and second clutch members have surfaces which are disposed in an annular liquid-retaining chamber and which are separated when the intermediate member is in a disengaged condition and which co-act to form a dashpot chamber when the intermediate member moves towards its fully engaged position. A feature of the prior clutch is rapid recharging of the dashpot, when the clutch disengages, with liquid from the liquid-retaining chamber; however, the intermediate member has to move through an appreciable part, e.g. 50% of its travel away from the engaged condition before the said surfaces separate from one another to permit liquid to penetrate between them and so recharge the dashpot. Furthermore the dashpot action is strong in the engaging direction of the intermediate member but is ineffective in the opposite direction, being limited to a suction effect.

In accordance with the present invention there is provided a synchronous self-shifting clutch comprising a first rotary clutch member with clutch teeth, a second rotary clutch member, an intermediate member with clutch teeth and constrained for helical movement relative to the second clutch member whereby to bring the clutch teeth of the intermediate member into and out of engagement with the clutch teeth of the first clutch member, means being provided for initiating precise inter-engagement of the clutch teeth of the intermediate member and of the first clutch member upon relative angular movement of the first and second clutch members in one direction, wherein a dashpot is provided for damping the movement of said intermediate member, the dashpot comprising a piston and an associated cylinder, the cylinder being substantially closed on one side of the piston and having a restricted liquid feed duct to the other side of the piston, a leakage path being provided through and/or around the piston to permit liquid to flow from one side of the piston to the other upon relative axial movement of the piston and cylinder so that during movement of the intermediate member in one direction liquid is transferred from one side of the piston to the other side to give a powerful damping action, and liquid is largely retained in the cylinder on the said other side of the piston to damp movement of the intermediate member in the other direction. Hence the dashpot is effective in some degree in both directions of movement of the intermediate member, i.e. into and out of engagement, thereby restraining shuttling motion of the clutch when subjected to rapid torque reversal conditions.

Where the engagement of the intermediate member is initiated by direct acting pawls, e.g. pawls carried by the intermedite member and cooperating with the clutch teeth of the first clutch member, provision is desirably made for initially free travel whereby the commencing part of the engaging movement of the intermediate member is materially free from restraint by the dashpot, for the purpose described in that specification, and for this purpose the chamber in which the piston is disposed may be shaped to provide a relatively unrestricted flow of oil from one side of the piston to the other when it is within a range of travel wherein the movement of the intermediate member is required not to be restrained. Such free travel is not ordinarily required in the case of a relay actuated clutch however, viz. a clutch in which as disclosed in Patent 2,972,397 an auxiliary member is provided which initiates toothed engagement of the intermediate member.

Figure 2:
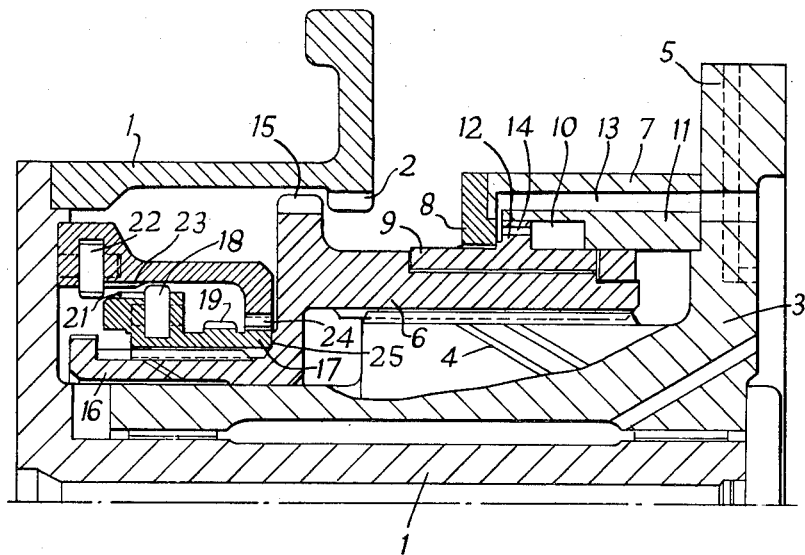
Figure 4:
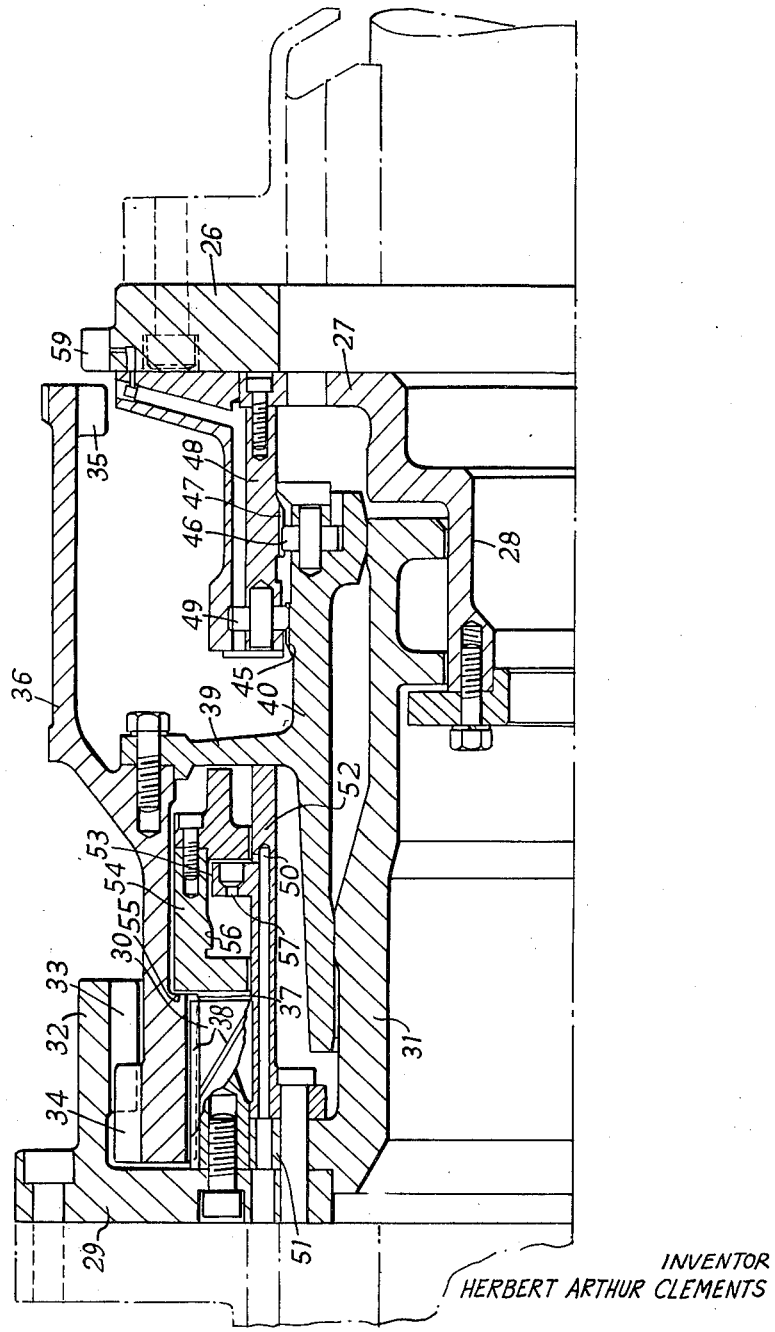
Figure 5:
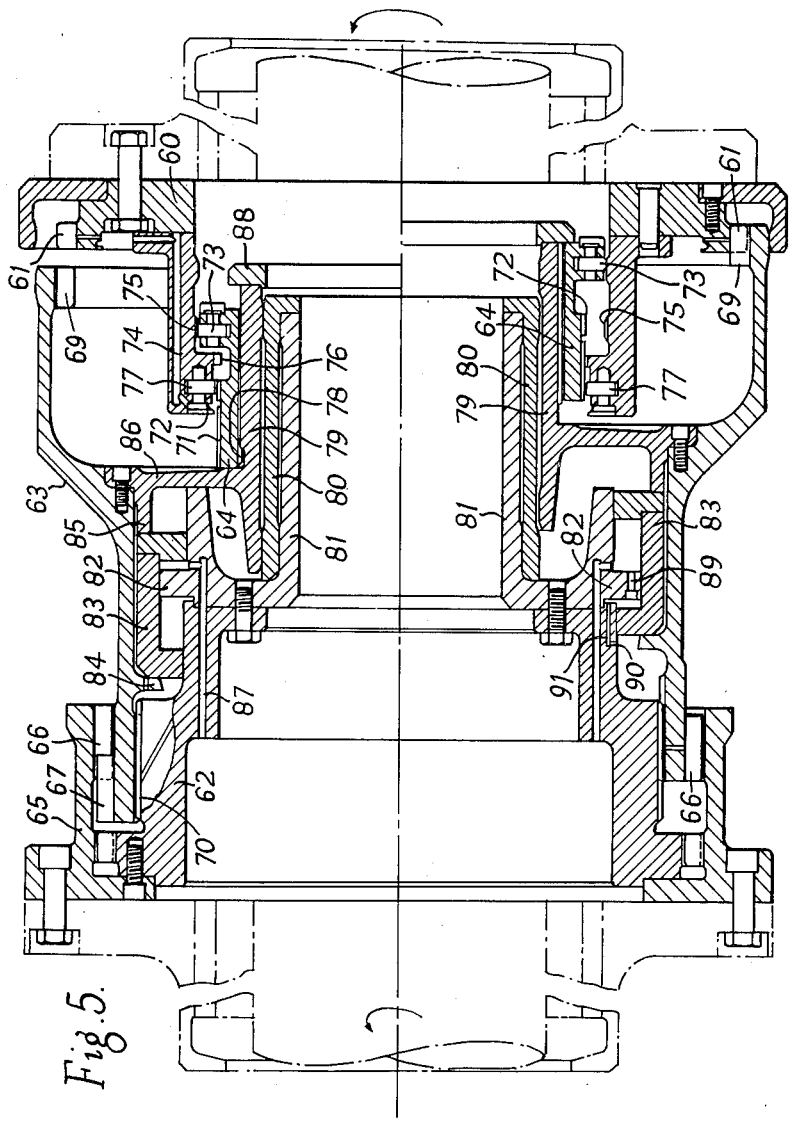

Embodiments of the invention are illustrated in the accompanying drawings, in which:

FIGS. 1 to 3 are longitudinal half-section views of a relay clutch according to the invention, FIGS. 1A to 3A being corresponding development views of the teeth of the clutches, FIG. 4 is a longitudinal half-section of a direct pawl actuated clutch according to a further embodiment of the invention, and FIG. 5 is a longitudinal section of another relay clutch according to the invention, the clutch being shown in the disengaged condition in the upper half of the FIGURE and in the engaged condition in the lower half.

Referring to FIGS. 1 to 3 and 1A to 3A, the relay actuated clutch shown therein has on the driven side a first clutch member 1 which carries a ring of internal clutch teeth 2. The second clutch member 3 on the driving side is formed with external helical splines 4 and with a radially outwardly projecting flange 5 which serves as an axial stop to limit the movement in the clutch-engaging direction of the intermediate member 6, which has internal helical splines engaged with the right hand helical splines of the second clutch member 3. The flange 5 has fixed thereto one end of a generally cylindrical part 7 projecting axially over part of the intermediate member 6 and carrying at its other end a radially inwardly projecting flange 8 the radially inner surface of which makes sliding contact with the outer surface of a cylindrical sleeve 9 fitted with slight radial and axial play into a shallow external annular groove in the intermediate member 6. The cylindrical part 7 is recessed internally to provide an annular piston chamber 10 one end wall of which is formed by the flange 8 and the other end wall of which is formed by the end of the unrecessed portion 11 of the cylindrical part 7, the portion 11 also being in sliding contact with the outer surface of the sleeve 9. A radially outwardly projecting annular flange 12 on the sleeve 9 has its outer surface in sliding contact with the bore of the piston chamber 10, and constitutes the piston of the dashpot. Liquid is fed to the piston chamber 10 via a duct 13 in the outer wall of the cylindrical part 7. The piston 12 is formed with a ring of restricted holes, one of which is visible at 14, via which liquid can pass from one side of the piston 12 to the other.

The intermediate member 6 carries a ring of external clutch teeth 15, and has a cylindrical extension 16 formed with external right hand helical splines with which engage internal helical splines in an auxiliary member 17 which carries a ring of pawls 18 which, viewing the clutch from the left hand end of FIG. 1, have their noses directed anti-clockwise, and two rings of auxiliary teeth 19 and 20 and a ring of ratchet teeth 21. The first clutch member 1 carries a ring of pawls 22, which have their noses directed clockwise, a ring of internal ratchet teeth 23 and a ring of internal teeth 24. The pawls 22 and 18 are respectively primary and secondary pawls having the functions described in United States Patent 3,093,226 granted June 11, 1963.

Figure 2A:
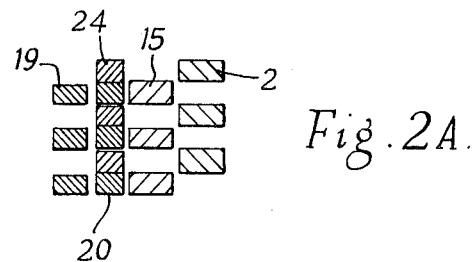

Assuming that the clutch (FIG. 1 and 1A) is in the disengaged condition with the clutch members 1 and 3 rotating anti-clockwise as viewed from the left, with the clutch member 1 rotating slightly faster than the clutch member 3, the secondary pawls 18 ratchet relative to the teeth 23 and the primary pawls 22 are centrifugally disengaged, the dashpot piston 12 is at the left hand end of the dashpot chamber 10 adjacent the flange 8, and the part of the dashpot chamber 10 to the right of the piston 12 is charged centrifugally with liquid supplied via the duct 13 and holes 14. When clutch member 3 is accelerated through synchronism with member 1, the pawls 18 engaged with ratchet teeth 21 and the auxiliary member 17 is shifted to the right so as to bring the teeth 20 into initial engagement with the teeth 24, the interaction of these teeth brings them into full interengagement at which stage the auxiliary member 17 is up against a stop formed by the surface 25, FIGS. 2 and 2A, and the continued interaction of the teeth 20 and 24 then causes the auxiliary member 17 to shift the intermediate member 6 helically relative to the second clutch member 3 to initiate precise inter-engagement of the clutch teeth 15 with the clutch teeth 2. The interaction of the clutch teeth 2 and 15 causes the intermediate member 6 to continue its movement to the right into full toothed engagement with the first clutch member 1, whereupon it is prevented from further movement in the same direction by the axial stop formed by the radial flange 5 (FIGS. 3 and 3A). During this movement the auxiliary member 17 also moves to the right, the teeth 20 disengaging from the teeth 24 and the teeth 19 engaging with them.

During the above-described movement of the intermediate member 6 the piston 12 moves axially in the dashpot chamber 10 from one end to the other thereof, and the liquid on the right hand side of the piston 12 passes through the restricted holes 14 to the other side of the piston. The movement of the piston 12 and hence of the intermediate member 6 is damped due to the liquid being able to flow only at a restricted rate from one side of the piston 12 to the other.

When the direction of relative rotation of the first and second clutch members 1 and 3 reverses the interaction of the clutch teeth 2 and 15 causes the intermediate member 6 to move back to the first-described position (FIGS. 1 and 1A), this movement being damped to a lesser degree by the dashpot, in which the liquid flows at a restricted rate back to the right hand side of the piston 12, and is partly ejected through the filling duct 13 against the pressure due to centrifugal force on the liquid feeding duct 13. If at any time during or after the movement of the intermediate member 6 toward its disengaged position the direction of relative rotation again reverses, the liquid on the right hand side of the piston 12 serves again to damp the movement of the intermediate member 6 towards the engaged position.

The piston 12 may be carried directly by, e.g. formed on, the intermediate member 6. However, the provision of a separate sleeve 9 carrying the piston 12 and having radial and slight axial play relative to the intermediate member 6 ensures concentricity between the relatively slidable surfaces of the dashpot, even although the intermediate member 6 may be slightly eccentric due to the working clearance in the helically splined connection between member 6 and the second clutch member 3.

The clutch shown in FIG. 4 is of the direct pawl actuated type. It differs also essentially from the clutch above described in that whereas in the previous case the dashpot comprises a stationary cylinder and an axially movable piston, in FIG. 4 the piston is stationary and the cylinder is axially movable.

Referring to FIG. 4, the clutch shown comprises a first clutch member including a ring 26 for connection to a driven machine, bolted to a flange 27 formed with a substantially cylindrical part 28. The second clutch member comprises a ring 29 for connection to a driving machine bolted to a ring 30 and to one end of a substantially cylindrical member 31 the other end of which surrounds the part 28 with clearance. The ring 29 is formed with a cylindrical part 32 with a ring of long internal driving teeth 33 widely spaced angularly, and adapted to cooperate with a ring of long external driving teeth 34, also widely spaced angularly, on an intermediate member 36 that carries a ring of internal clutch driving teeth 35 adapted to cooperate with a ring of external clutch driven teeth 59 on the ring 26. The intermediate member 36 is formed with internal helical splines 37 engaged with right handed external helical splines 38 on the ring 30, and is connected to a flange 39 on a sleeve 40 slidable axially relative to the member 31. The sleeve 40 is formed with a ring of ratchet teeth 45 and secondary pawls 46 adapted to cooperate with ratchet teeth 47 carried by a cylindrical part 48 bolted to the ring 26. The part 48 carries a ring of primary pawls 49 adapted to cooperate with the ratchet teeth 45. To a flange 51 on the sleeve 31 is bolted a substantially cylindrical part 52 formed with an external annular flange 53 that serves as the piston of a dashpot, to the right hand side of which piston liquid is fed centrifugally via a duct 50. The annular cylinder 54 of which is slidable axially on the part 52, being located with slight axial play between the flange 39 and an internal shoulder 55 in the intermediate member 36. The cylinder is formed with a part 56 of reduced bore capable of just clearing the diameter of the piston 53, which has a plurality of restricted axial ducts 57.

When the clutch is over-running the pawls 46 and/or 49 ratchet relative to their ratchet teeth 47 and 44. When the relative rotation of the first and second clutch parts tends to reverse, pawls 46 or 49 are picked up by ratchet teeth 47 or 45 and the intermediate member 36 is shifted helically to the right to bring its clutch teeth 35 into initial inter-engagement with the clutch teeth 59 on the ring 26, whereupon the interaction of the clutch teeth 35 and 59 draws the intermediate member 36 into full toothed engagement.

The first part of this movement of the intermediate member 36 occurs without substantial restraint, since there is relatively wide radial clearance between the bore of the cylinder 54 and the piston 53, and liquid on the right hand side of the piston 53 can pass via this clearance and the ducts 57 to the left hand side of the piston. When the intermediate member has moved more than half way from the position shown, there is much smaller clearance between the smaller bore 56 and the piston 53, and liquid then flows from one side of the piston to the other mainly via the restricted ducts 57. During the completion of the engaging movement of the intermediate member the restraining effect of the dashpot is therefore stronger than during the preceding movement.

The clutch shown in FIG. 5 comprises a first clutch driven member formed by a ring 60 having external clutch teeth 61, a second clutch driving member 62, an intermediate member 63 and an auxiliary clutch intermediate member 64. The second clutch member 62 carries a ring 65 formed with widely spaced internal driving teeth 66 located between widely spaced external teeth 67 on the intermediate member 63, which has a ring of internal clutch teeth 69, and the member 62 is also formed with right hand external helical splines 70 with which are engaged internal helical splines in the intermediate member 63. The auxiliary clutch intermediate member 64 is formed with a ring of long straight teeth 71 and a ring of ratchet teeth 72, and carries secondary pawls 73. An auxiliary clutch member 74 fixed to the ring 60 carries a ring of internal ratchet teeth 75, a ring of teeth 76 and primary pawls 77. With the clutch in the condition shown in the upper half of FIG. 5 the pawls 73 and 77 are positioned for ratchetting relationship with the ratchet teeth 75 and 72 respectively. The member 64 is formed with internal right hand helical splines 78 engaged with external helical splines on a sleeve 79 fixed to the intermediate member 63 and slidable axially on a sleeve 80 with hardened surfaces mounted on a cylindrical member 81 fixed to the second clutch member 62, and formed with an annular piston 82 that projects into an annular dashpot cylinder 83 located between an internal flange 84 of the intermediate member 63 and a cylindrical projection 85 on a flange 86 carried by the sleeve 79. Liquid is fed centrifugally to one side (the right hand side in FIG. 5) of the piston 82 via a duct 87.

During periods of over-running the parts are in the positions shown in the upper half of FIG. 5. When the direction of relative rotation of the first and second clutch members tends to reverse, pawls 73 or 77 engage their associated ratchet teeth and the axiliary clutch intermediate member 64 is shifted to the right into contact with a stop 88 on the sleeve 79, whereupon the intermediate member 63 is shifted to the right to initiate inter-engagement of the clutch teeth 61 and 69. The interaction of these clutch teeth results in full inter-engagement, the parts then having the positions shown in the lower half of FIG. 5.

During this movement of the intermediate member 63 the dashpot cylinder 83 moves to the right relative to the axially stationary piston 82, and liquid flows from the left hand side of the piston to the right hand side thereof via restricted ducts 89 in the piston 82. As the intermediate member 63 moves into the fully engaged position the cylinder 83 uncovers ports 90 so that liquid can flow from the left hand side of the piston 82 through the said ports and relief ducts 91. Since liquid at relatively high centrifugal pressure continues to be fed via ducts 87 to the right hand side of the piston, the pressure on that side remains high. The pressure on the left hand side of the piston is however relatively low, being relieved due to the continuous flow of liquid through the ducts 91 and ports 90. Hence when the clutch is engaged as shown in the lower half of FIG. 5 the differential pressure on the piston 82 restrains disengagement of the clutch until the reverse torque tending to disengage the clutch is high enough, e.g. 10% of the normal driving torque, to cause the clutch to disengage against the restraining force due to the unbalanced liquid pressure in the dashpot.

I claim:
1. A synchronous self-shifting clutch comprising a first rotary clutch member with clutch teeth, a second rotary clutch member, an intermediate member with clutch teeth and constrained for helical movement relative to the second clutch member whereby to bring the clutch teeth of the intermediate member into and out of engagement with the clutch teeth of the first clutch member, means for initiating precise inter-engagement of the clutch teeth of said intermediate member and of said first clutch member upon relative angular movement of said first and second clutch members in one direction, a cylinder, means mechanically connecting said cylinder to one of said second and intermediate members, a piston located within said cylinder, and means mechanically connecting said piston to the other of said second and intermediate members, means substantially closing said cylinder on one side of said piston, a liquid feed duct to said cylinder at the other side of said piston, said cylinder being otherwise substantially closed on the said other side, the clutch including means defining a leakage path to permit liquid to flow at a restricted rate from one side of the piston to the other upon relative axial movement of the piston and cylinder so that during movement of the intermediate member in one direction liquid is transferred from one side of the piston to the other side at a restricted rate to give a powerful damping action, and liquid is largely retained in the cylinder on the said other side of the piston in readiness to flow back to the said one side of the piston at a restricted rate upon movement of the intermediate member in the other direction to damp movement of the intermediate member in the said other direction.

2. A synchronous self-shifting clutch according to claim 1, wherein the cylinder and piston are shaped in relation to one another so as to provide a relatively wide open leakage path past said piston during the initial part of the movement of said intermediate member in the clutch engaging direction and a restricted leakage path during the remainder of its movement in the same direction.

3. A synchronous self-shifting clutch according to claim 1, wherein said liquid feed duct opens into said cylinder at the side of said piston to which liquid is expelled during relative movement of said piston and cylinder when said intermediate member moves in the clutch engaging direction, the clutch including at least one relief duct to bleed said cylinder at the other side of said piston, said relief duct being closed when the clutch is disengaged and remaining closed during the initial part of the movement of the intermediate member in the clutch engaging direction, and opening to reduce the pressure in the cylinder at said other side when the intermediate member approaches the fully engaged condition of the clutch.

References Cited by the Examiner
UNITED STATES PATENTS
2,807,343   9/57   Ryder et al.
2,913,084   11/59   Short _____ 192—53.8 X FOREIGN PATENTS
93,368   3/22   Switzerland.

DAVID J. WILLAMOWSKY, *Primary Examiner.*